C. C. BOONE.
FISH OPENER AND SCALER.
APPLICATION FILED JULY 16, 1918.
1,294,609.
Patented Feb. 18, 1919.
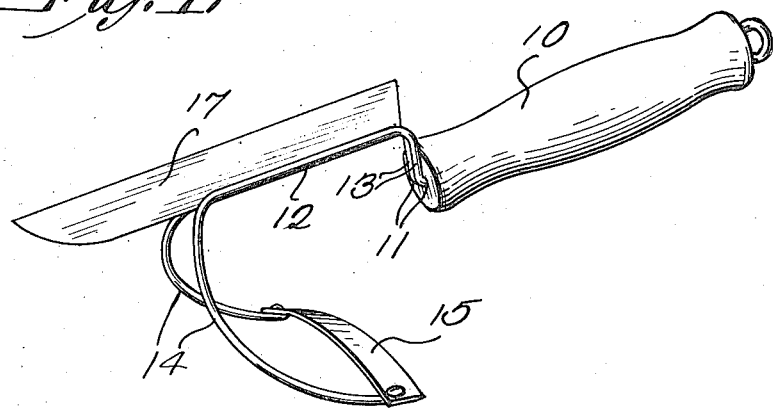
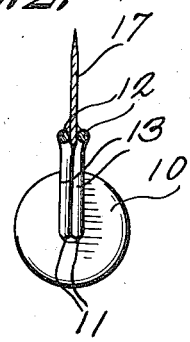
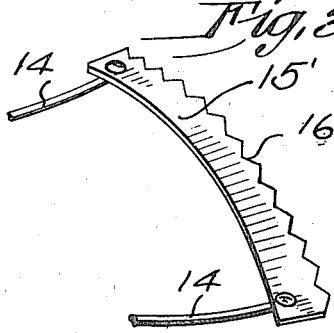

UNITED STATES PATENT OFFICE.

CHARLES C. BOONE, OF MACKAY, IDAHO.

FISH OPENER AND SCALER.

1,294,609.　　　　Specification of Letters Patent.　　Patented Feb. 18, 1919.

Application filed July 16, 1918.　Serial No. 245,207.

*To all whom it may concern:*

Be it known that I, CHARLES C. BOONE, a citizen of the United States, residing at Mackay, in the county of Custer, State of Idaho, have invented certain new and useful Improvements in Fish Openers and Scalers; and I do hereby declare the following to be a full, clear, and exact description of the invention, such as will enable others skilled in the art to which it appertains to make and use the same.

This invention relates to new and useful improvements in fish cleaning devices and particularly to openers and scalers.

One object of the present invention is to provide a novel and improved device of this character wherein the opening knife blade and the scale remover are connected to the handle by the same means.

Another object is to provide a novel and improved device wherein the knife and scaling member are securely and effectively held in proper position.

Other objects and advantages will be apparent from the following description when taken in connection with the accompanying drawing.

In the drawing:

Figure 1 is a perspective view of a fish opener and scaler made in accordance with my invention.

Fig. 2 is a vertical transverse sectional view through the knife blade and the wire supporting member.

Fig. 3 is a perspective view of the scale removing member, showing a modification thereof.

Referring particularly to the accompanying drawing, 10 represents a handle which is preferably made of wood, but which may be made of any suitable or desired material. Extending longitudinally through the center of the handle are two wire members 11, the same being properly and securely fastened within the handle. The outer portions of the wires, at one end of the handle, are bent to extend across a part of the end of handle, and then are extended longitudinally therefrom, the said portions being shown at 12 and 13, respectively. The portions of the wires, beyond the members 13, are extended in divergent relation, and curved longitudinally, as shown at 14.

The terminals of the wires are directed inwardly toward the adjacent end of the handle, as clearly shown, and secured to and extending between these terminals is a metal blade 15, said blade having the edge adjacent the handle sharpened for the purpose of removing the scales from the fish.

As shown in Fig. 3, of the drawing, the blade 15' has its inner edge formed with serrations 16, said blade being adapted to be used instead of the one shown in the other figures.

Disposed with its back between the parallel portions 12 of the wires, is a knife blade 17, the cutting edge of which is directed away from the wires are shown in the drawing. Approximately one-half of the blade is secured between the wires, while the other portion extends beyond the outer ends of the members 12.

As will be understood, the blade 17 is particularly adapted for ripping open the belly of the fish, while the blade 15 is used to scrape the scales from the body of the fish. The back of the knife blade is preferably soldered between the wire portions 12, but may be secured in any other desirable means.

Attention is directed to the fact that the scraper blade 15 is longitudinally arched whereby it will properly fit the curvature of the body of the fish, thus enabling the operator to more effectively remove the scales, and remove the greatest number at one time and with one sweep of the blade.

What is claimed is:

A fish cleaning device including a handle, a pair of wires secured within the handle and extending from one end thereof, said extending portions of the wires being extended in parallel relation and then diverging and longitudinally curved, an arched scraper blade secured to and extending between the outer terminals of the wires, and a ripping knife having its back secured between said parallel portions of the wires.

In testimony whereof I affix my signature in the presence of two witnesses.

CHARLES C. BOONE.

Witnesses:
E. R. MADSEN,
W. H. BRASHEAR.